United States Patent Office 2,912,305
Patented Nov. 10, 1959

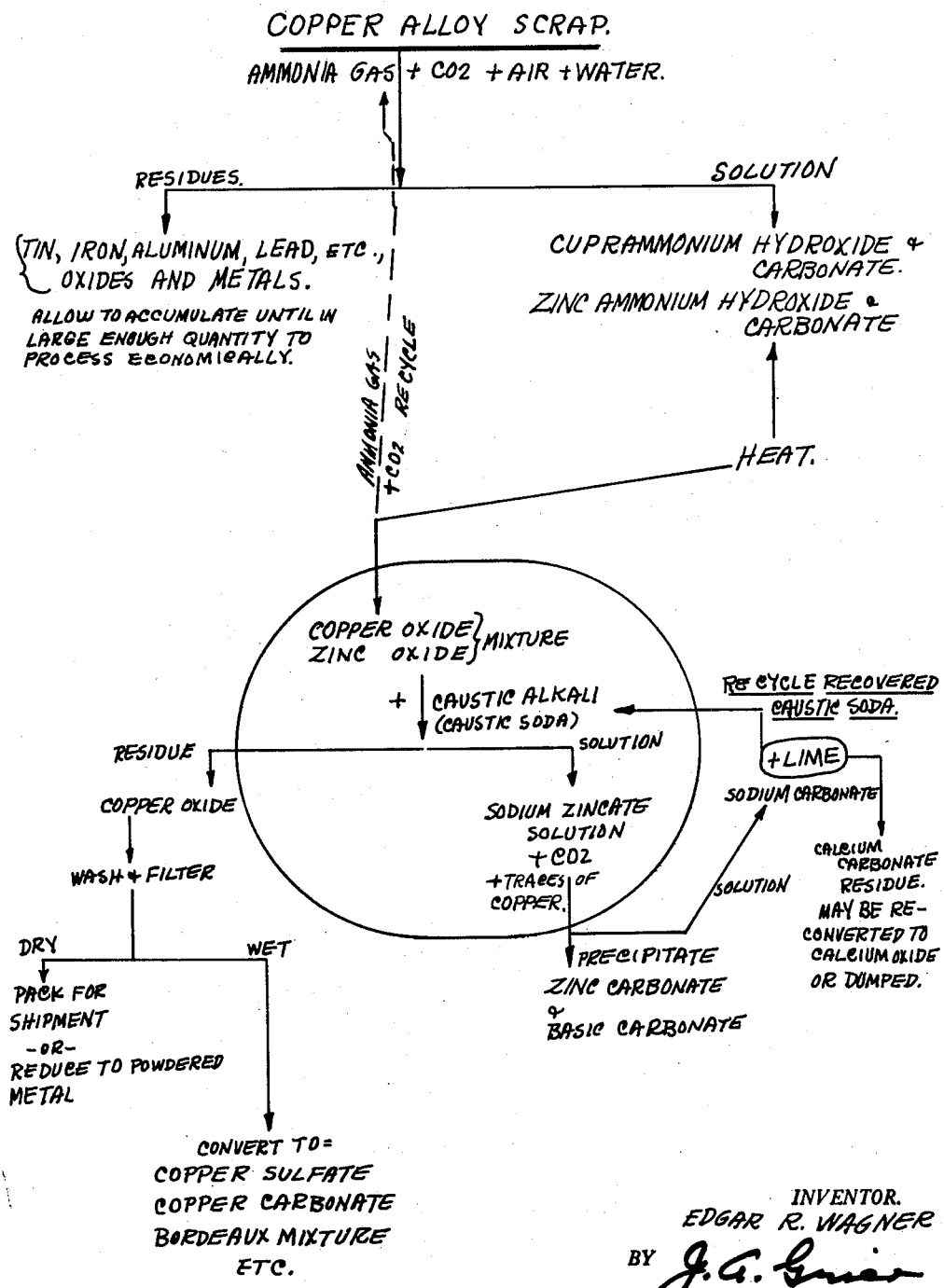

2,912,305

NON-FERROUS SCRAP TREATMENT

Edgar R. Wagner, New York, N.Y., assignor to Metals and Chemicals Corporation, a corporation of New York Application May 31, 1956, Serial No. 588,551

2 Claims. (Cl. 23—147)

This invention relates to a process in which copper alloy scrap, particularly brass borings and turnings, is treated to effect the production of pure copper and pure zinc compounds therefrom, and an object of the invention is the provision of a process for the recovery of said pure compounds from copper alloy or brass scrap more economically than has heretofore been known in this art.

Other objects of the invention will be apparent to those skilled in the art, upon a study of the following specification.

The accompanying drawing is a flow chart of one of the processes according to the invention.

A preferred process to produce the above mentioned results comprises the following steps:

(1) Dissolving the scrap in ammoniacal solution,
(2) Separating the dissolved copper and zinc from the residual materials,
(3) Boiling out the ammonia and storing it conveniently for reuse,
(4) Separating copper oxide from zinc oxide by dissolving said zinc oxide in a caustic alkali, such as sodium hydroxide, and leaving the copper oxide behind. The copper oxide may be sold as such, or it may be converted chemically to any other copper compound desired,
(5) Precipitating the zinc from the caustic alkali solution by means of carbon dioxide, in the form of (basic or normal zinc carbonate) leaving the alkali in the solution as alkali carbonate,
(6) Reconversion of alkali carbonate to caustic alkali by means of hydrated lime, or by electrolysis, and
(7) Conversion of zinc carbonate to any desired zinc compound by subsequent treatment.

*Description of process*

A pile of copper alloy scrap is subjected to a water spray. At the same time air, plus a small amount of $CO_2$ is bubbled through the scrap pile. Both copper and zinc dissolve readily in the ammoniacal solution, thereby producing cuprous and cupric ammonia complexes, and zinc-ammonia complex in solution. If nickel (from nickel-silver, German silver or nickel plated brass) is present, it dissolves, but at a much slower rate than the copper or zinc. Cadmium will also dissolve.

When the solution is boiled, the ammonia is driven off, recovered and is reused. The metals come out of solution as mixed oxides.

Copper and zinc oxides are readily separated by means of caustic soda, which dissolves the zinc oxide, but leaves the copper oxides together with any nickel and/or cadmium that may be present.

The dissolved zinc is treated with carbon dioxide, which may be from the flue gas, or present in flue gas, or from any other source, and is precipitated as zinc carbonate or basic zinc carbonate, depending upon the amount of $CO_2$ that is fed into the solution. The liquid contains sodium carbonate, plus a trace of copper as bicarbonate.

The copper precipitates, upon heating the solution, as basic copper carbonate, and the clear liquid, which contains only alkali (sodium) carbonate, may be reconverted to caustic alkali (caustic soda) by treatment with hydrated lime in the usual and well known manner. The reconverted caustic soda is reused for the extraction of more zinc from the mixed oxides.

The precipitate of zinc carbonate is washed free of alkali carbonate and is then filtered and dried, or it may be converted into any compound for which there may be a demand.

The dried zinc carbonate:

(1) May be sold as is (to a very limited market)
(2) May be converted by heating to around 600° C. to chemically active zinc oxide, suitable for the rubber industry, or it
(3) May be converted to pigment grade zinc oxide (chemically inert) by heating to 1100° C.

Hereinabove I have described the disposal of the copper oxide as such, however if other copper compounds are desired, such for example as the sulfate, any cadmium or nickel present may be separated in the crystallization process. Since they are present, if at all, only in very small amounts, so it is preferred to let them accumulate in the mother (liquor) from which the copper salt (sulfate) is being crystallized. The mother liquor is drained off from time to time and the nickel and cadmium may be removed by precipitation with caustic soda or sodium carbonate, and the mixture of copper, nickel and cadmium hydroxides may be treated separately in any suitable manner.

Although I have herein shown and described by way of example one manner of practicing the invention, I am not to be limited to the exact steps or modifications of such steps described herein, as many changes may be made in such steps within the scope of the following claims.

I claim:

1. A copper-zinc alloy scrap treatment which includes leaching said scrap with ammoniacal liquor under oxidizing conditions to produce a solution which contains soluble ammoniacal compounds of copper and zinc, the step of precipitating copper and zinc oxides from said liquor by boiling out the ammonia, and the final step of separating the copper from the zinc by treating the precipitated copper and zinc oxides with an aqueous solution of caustic soda to dissolve the zinc oxide away from the copper oxide.

2. A method of treating copper-zinc alloy scrap which includes treating said scrap with aqueous ammonia to form ammoniacal compounds of copper and zinc and then precipitating copper and zinc oxides from said solution by boiling the ammoniacal solution to remove the ammonia and treating these oxides with aqueous caustic soda.

References Cited in the file of this patent

UNITED STATES PATENTS

| 654,804 | Rigg | July 31, 1900 |
| 1,579,302 | Gidden et al. | Apr. 6, 1926 |
| 2,525,242 | Rowe | Oct. 10, 1950 |
| 2,695,842 | McGauley | Nov. 30, 1954 |

FOREIGN PATENTS

| 1,605 of 1881 | Great Britain | Apr. 12, 1881 |
| 618,262 | Great Britain | Feb. 18, 1949 |